(12) United States Patent
Chen

(10) Patent No.: US 9,320,079 B2
(45) Date of Patent: Apr. 19, 2016

(54) WIRELESS TRANSMISSION DEVICE AND CONNECTING DEVICE

(71) Applicants: LITE-ON ELECTRONICS (GUANGZHOU) LIMITED, Guangzhou (CN); LITE-ON TECHNOLOGY CORPORATION, Taipei (TW)

(72) Inventor: Chun-Yi Chen, Taitung County (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 169 days.

(21) Appl. No.: 14/106,005

(22) Filed: Dec. 13, 2013

(65) Prior Publication Data

US 2015/0103757 A1 Apr. 16, 2015

(30) Foreign Application Priority Data

Oct. 14, 2013 (CN) .......................... 2013 1 0479337

(51) Int. Cl.
*H04W 4/00* (2009.01)
*H04W 84/18* (2009.01)
*H04W 8/00* (2009.01)

(52) U.S. Cl.
CPC .............. *H04W 84/18* (2013.01); *H04W 8/005* (2013.01)

(58) Field of Classification Search
None
See application file for complete search history.

(56) References Cited

U.S. PATENT DOCUMENTS

| 7,826,408 | B1* | 11/2010 | Vleugels et al. .............. 370/328 |
| 2007/0147332 | A1* | 6/2007 | Lappetelainen et al. ...... 370/346 |
| 2008/0247377 | A1* | 10/2008 | Van Horn et al. ............. 370/348 |
| 2009/0092049 | A1* | 4/2009 | Hargrave et al. .............. 370/235 |
| 2010/0081381 | A1* | 4/2010 | Rofougaran ................... 455/41.2 |
| 2010/0081422 | A1* | 4/2010 | Rofougaran ................... 455/420 |
| 2012/0328061 | A1* | 12/2012 | Chow ............................ 375/354 |
| 2013/0109314 | A1* | 5/2013 | Kneckt et al. ................. 455/41.2 |
| 2014/0029495 | A1* | 1/2014 | Ise ................................. 370/311 |
| 2014/0206322 | A1* | 7/2014 | Dimou et al. ............. 455/414.1 |

* cited by examiner

*Primary Examiner* — Michael J Moore, Jr.
(74) *Attorney, Agent, or Firm* — Li & Cai Intellectual Property (USA) Office

(57) ABSTRACT

An exemplary embodiment of the present disclosure illustrates a wireless transmission device. The wireless transmission device includes a processor, a remote module, and a transmission module. The remote module includes a wireless transmitting unit. The remote module couples to the processor, the transmission device couples to the processor. The wireless transmitting unit is used for transmitting a first enable signal. The transmission module is used for transferring at least one of data signals after a connection is established between the wireless transmission device and a connecting device. The connecting device enters a connectable mode after receiving the first enable signal and lets the wireless transmission further search for the connecting device.

7 Claims, 7 Drawing Sheets

WIRELESS TRANSMISSION DEVICE AND CONNECTING DEVICE

BACKGROUND

1. Technical Field

The present disclosure is related to a transmission device, in particular, to a wireless transmission device for connecting to a connecting device.

2. Description of Related Art

As the wireless technology matures, wireless networks become increasingly common. Low data rate wireless transmission devices in particular, have gained much attention in fields such as home appliance, toy, industrial technology, security and health care, etc. A main reason being that the low data rate wireless transmission devices possess characteristics such as low cost, low power consumption and easy implementation, etc., and are suitable for applications that require low maintenance and high service coverage. In various low data rate wireless communication protocols, IEEE 802.15.4 and Zigbee are the two most representative standards.

For instance, wireless transmission devices within a corporate or a family can form a Personal Area Network (PAN), for transmitting data within the corporate or the family. Taking the Zigbee wireless communication protocol as an example, the protocol specifies 26 wireless channels, where nodes of each channel can coexist and do not interfere with each other. As mentioned above, such low data rate wireless transmission devices have simple structures and are easy to implement. Hence Zigbee is utilized widely to create private wireless ad-hoc networks, for realizing home automation, office automation and/or wireless sensing, etc.

Please refer to FIG. 1. FIG. 1 is a diagram illustrating a communication link possessing a wireless transmission device and a connecting device. The communication link 10 can be a PAN, which comprises a plurality of wireless communication devices 12~14 and the connecting device 11. The connecting device 11 comprises an enable button 111 and a reset button 112. The wireless transmission devices 12~14 can be electronic devices such as a socket detector or a temperature controller, etc., which utilize wireless data transmission.

In a Zigbee PAN, the most important step is the addition of a new node. A reason being that, since each wireless transmission device communicates with the connecting device via wireless transmission, an unexpected wireless transmission device might join the PAN, or a wireless transmission device might join an unexpected PAN. Consequently issues such as leakage of personal privacy information or illegally occupying a bandwidth of the wireless network may occur.

Please refer to FIG. 1 and FIG. 2 together. FIG. 2 is a flowchart illustrating a connection being established between a conventional transmission device (e.g. a Zigbee device) and a connecting device (e.g. a coordinator). Generally, an enable button 111 is conventionally disposed on the connecting device 11. As shown by step 211 in FIG. 2, when a user is to establish a connection between the wireless transmission device 22 and the connecting device 21, the user presses the enable button on the connecting device 21, for the connecting device 21 to generate a command for enabling a connectable mode. Subsequently, in step 212, the connecting device 21 recognizes that the wireless transmission device 22 is intending to join/connect. The connecting device 21 enters the connectable mode.

In step 221, after the user has enabled the connectable mode of the connecting device 21, the user operates the wireless transmission device 22 to send out a beacon request, for searching for any connecting devices 21 that are in the connectable mode. In step 213, when the connecting device 21 has received the beacon request from the wireless transmission device 22, the connecting device 21 replies a beacon response to the wireless transmission device 22, to notify the wireless transmission device 22 the presence of the connecting device 21, which is in the connectable mode. In step 222, if the wireless transmission device 22 is to establish a connection, the wireless transmission device 22 transmits an associate request to the connecting device 21. In step 214, after the connecting device 21 has received the associate request from the wireless transmission device 22, the connecting device 21 transmits an associate response to the wireless transmission device 22 to complete establishing the connection between the wireless transmission device 22 and the connecting device 21.

After the connecting device 21 has entered in the connectable mode, the connecting device 21 can receive the associate request from the wireless transmission device during a connectable mode period D. After the connectable mode period D has expired, the connecting device 21 turns off the connectable mode in step 215. This way, unexpected wireless transmission devices can be prevented from joining the PAN.

However, for such conventional connection method, when the user is to establish a connection between the wireless transmission devices 12~14 and the connecting device 11, the user has to initiate from the connecting device 11. Further, if the connecting device 11 is at a place (e.g. a tall stand or a ceiling, etc.) not easily reached by the user, the user may have difficulties accessing the enable button. The conventional connection method causes inconveniences in establishing connections, and may result in an unfriendly impression to the user and low market acceptance.

SUMMARY

An exemplary embodiment of the present disclosure provides a wireless transmission device for wirelessly connecting to a connecting device. The wireless transmission device comprises a remote module, a processor and a transmission module. The remote module comprises a wireless transmitting unit for transmitting a first enable signal which can be transformed so as to assist or enable the connecting device to enter a connectable mode that allows only the wireless transmission device to discover the connecting device. The processor is coupled to the remote module, for controlling the wireless transmitting unit to transmit the first enable signal to the connecting device. The transmission module is coupled to the processor, for transmitting at least one of data signals when a connection is established between the wireless transmission device and the connecting device.

Another exemplary embodiment of the present disclosure provides a connecting device for providing at least one wireless transmission device for wireless connection. The connecting device comprises an enable module, a processor and a transmission module. The enable module comprises a wireless receiving unit for receiving at least a first enable signal which can be transformed so as to assist or enable the connecting device to enter a connectable mode that allows only the wireless transmission device to discover the connecting device. The processor is coupled to the enable module, for controlling the wireless receiving unit to receive the first enable signal transmitted by the wireless transmission device. The transmission module is coupled to the processor, for transmitting at least one of data signals when establishing a connection between the connecting device and the at least one wireless transmission device.

Another exemplary embodiment of the present disclosure provides a wireless transmission device, for wirelessly connecting to a connecting device. The wireless transmission device comprises a battery, a processor, and a transmission module. The battery is for providing power to the wireless transmission device and receiving a clock signal. The battery comprises a remote module. The remote module comprises a wireless transmitting unit for transmitting a first enable signal which can be transformed so as to assist or enable the connecting device to enter a connectable mode that allows only the wireless transmission device to discover the connecting device. The processor is coupled to the battery, for generating the clock signal and controlling the wireless transmitting unit to transmit the first enable signal to the connecting device, for the connecting device to enter a connectable mode. The transmission module is coupled to the processor, for transmitting at least one of data signals after establishing a connection between the connecting device and the wireless transmission device.

In summary, by utilizing the wireless transmission device and the connecting device according to the embodiments of the present disclosure, the operation during establishing a network connection for the conventional wireless transmission device and the conventional connecting device, such as the Zigbee wireless transmission device and the connecting device, can be improved. Hence the user can control the wireless network system, such as the Zigbee wireless network system, according to the conventional behaviors (e.g. similar to controlling a TV and an air conditioner remotely, etc.). The above mentioned wireless transmission device and the connecting device can provide an operational manner that is more friendly and intuitive to the user, as well as increasing the market competitiveness of the connecting device (e.g. the Zigbee connecting device).

In order to further understand the techniques, means and effects of the present disclosure, the following detailed descriptions and appended drawings are hereby referred, such that, through which, the purposes, features and aspects of the present disclosure can be thoroughly and concretely appreciated; however, the appended drawings are merely provided for reference and illustration, without any intention to be used for limiting the present disclosure.

BRIEF DESCRIPTION OF THE DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

DESCRIPTION OF THE EXEMPLARY EMBODIMENTS

Figure 1:
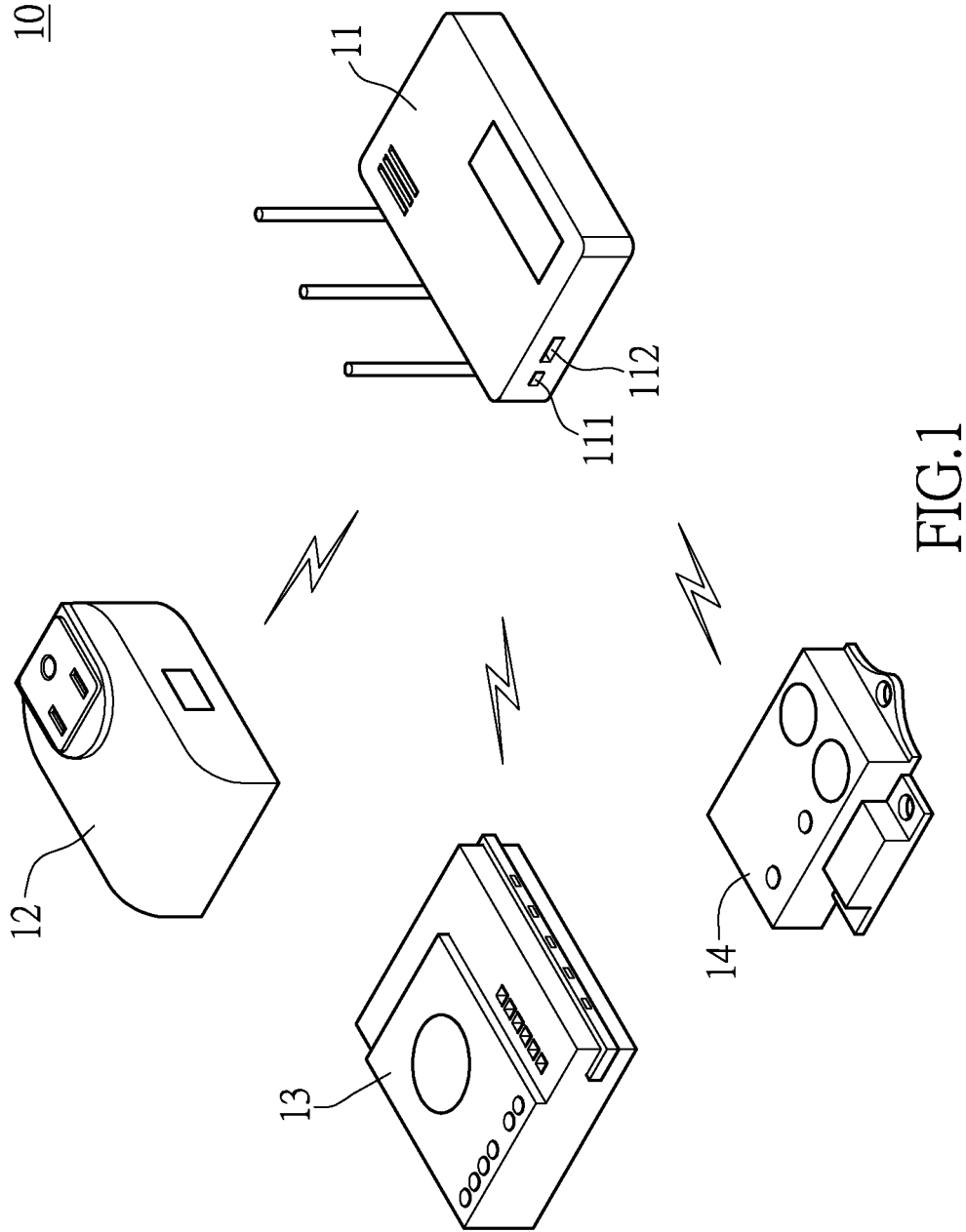
FIG. 1 is a diagram illustrating a communication link possessing a wireless transmission device and a connecting device.
Figure 2:
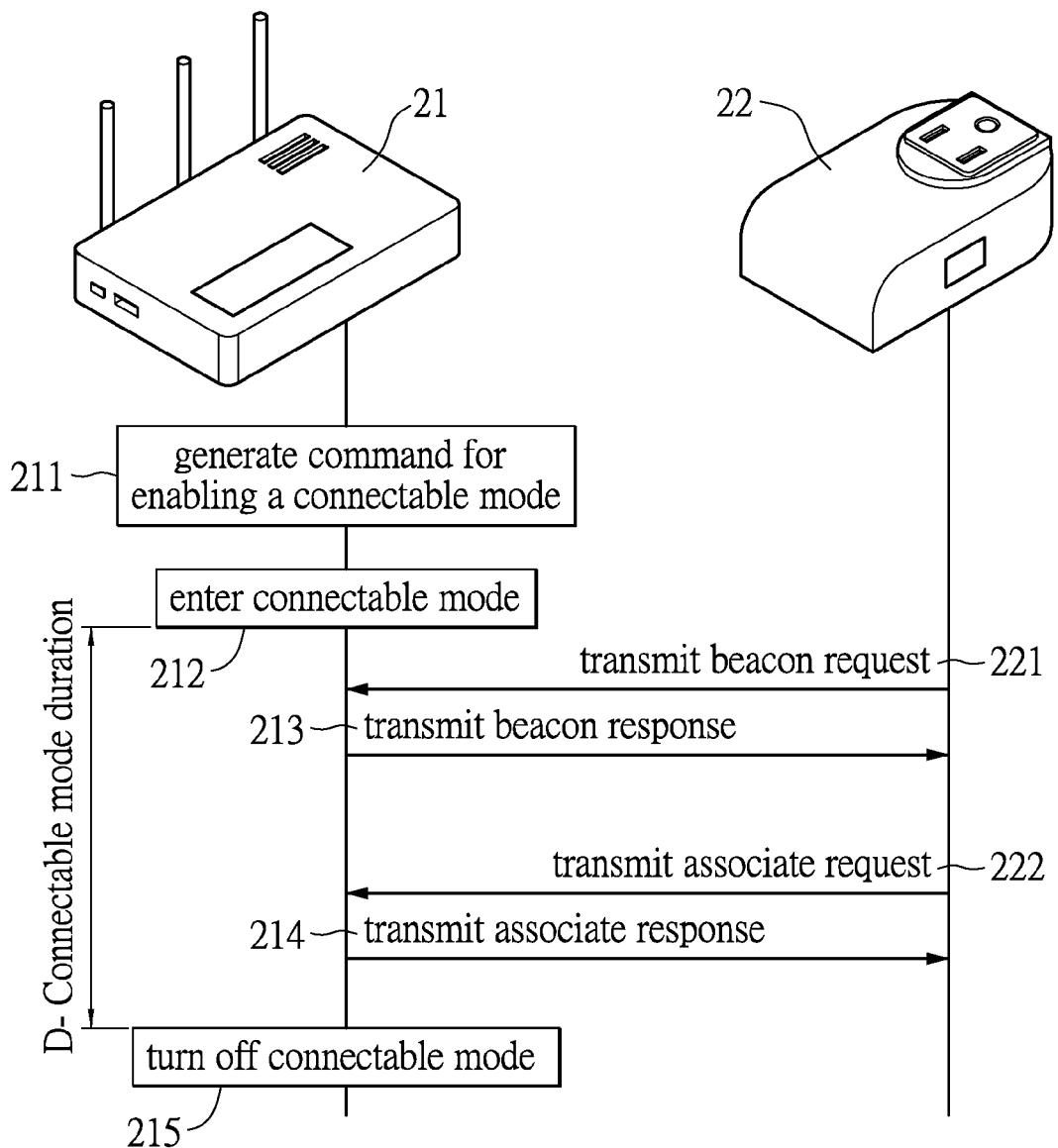
FIG. 2 is a flowchart illustrating a connection being established between a conventional transmission device and a connecting device.

Reference will now be made in detail to the exemplary embodiments of the present disclosure, examples of which are illustrated in the accompanying drawings. Wherever possible, the same reference numbers are used in the drawings and the description to refer to the same or like parts.

Figure 3A:
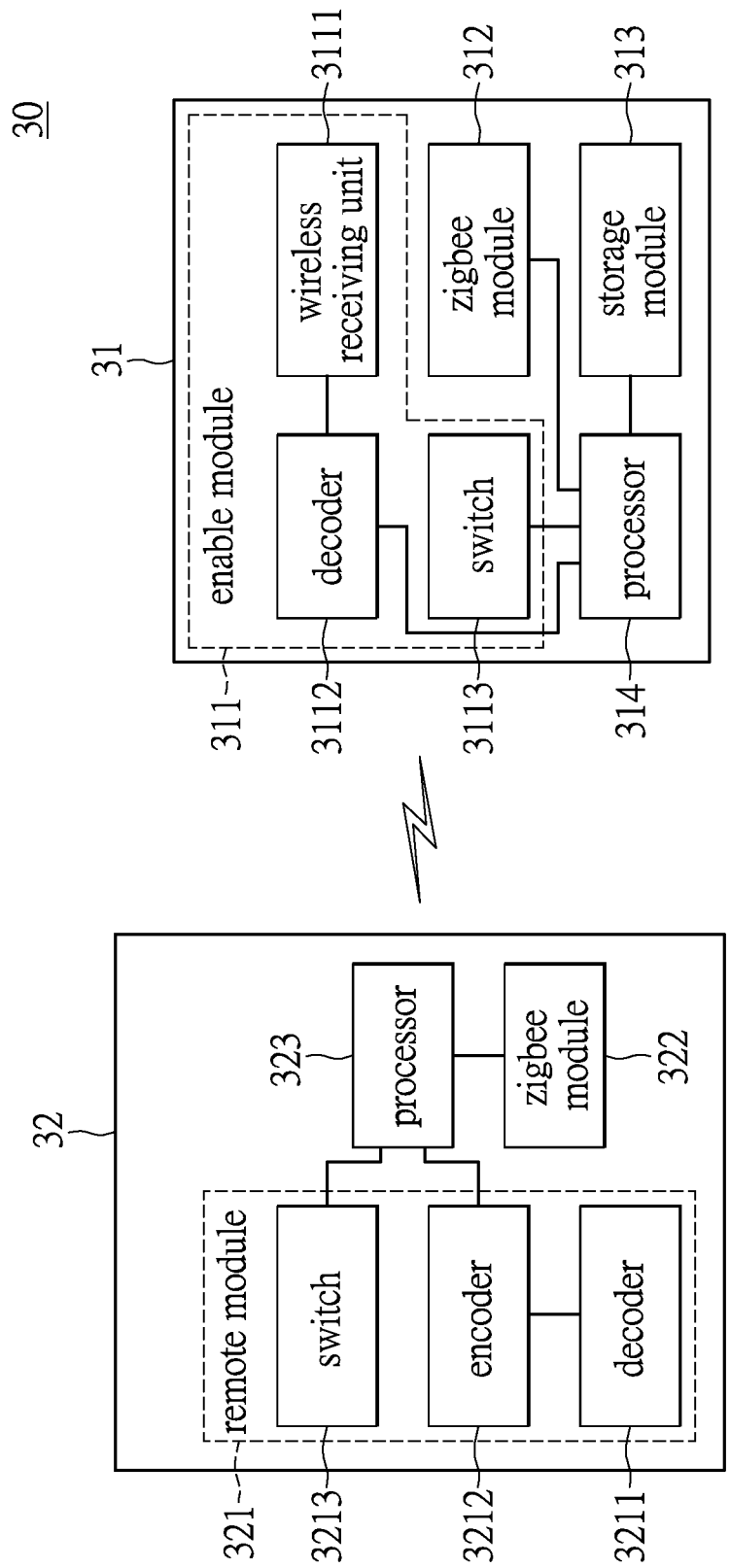
FIG. 3A is a structural diagram illustrating a communication link possessing a wireless transmission device and a connecting device according to an embodiment of the present disclosure.

Please refer to FIG. 3A. FIG. 3A is a structural diagram illustrating a communication link possessing a wireless transmission device and a connecting device according to an embodiment of the present disclosure. In FIG. 3A, the communication link 30 is formed by establishing a connecting between the connecting device 31 and the wireless transmission device 32. The communication link 30 can be a wireless network such as a Personal Area Network (PAN). In FIG. 3A, wireless communication can be performed between the wireless transmission device 32 and the connecting device 31 for exchanging data.

The connecting device 31 comprises an enable module 311, a Zigbee module 312, a storage module 313 and a processor 314. The enable module 311 comprises a wireless receiving unit 3111, a decoder 3113 and a switch 3113. The enable module 311, the Zigbee module 312 and the storage module 313 are coupled to the processor 314. More specifically, the decoder 3112 and the switch 3113 in the enable module 311 are coupled to the processor 314. The wireless receiving unit 3111 is coupled to the decoder 3112.

The wireless transmission device 32 comprises a remote module 321, a Zigbee module 322 and a processor 313. The remote module 321 comprises a wireless transmitting unit 3211, an encoder 3212 and a switch 3213. The remote module 321 and the Zigbee module 322 are coupled to the processor 323. More specifically, the switch 3213 and the encoder 3212 are coupled to the processor and the wireless transmitting unit 3211 is coupled to the encoder 3212.

The switches 3213 and 3113 are operated by the user, for generating a trigger signal to the wireless transmission device 32 and the connecting device 31 respectively. The trigger signal is provided for the processor 323 and the processor 314 to generate an enable signal respectively. In an embodiment of the present disclosure, the switches 3213 and 3113 are disposed on an external part of the wireless transmission device 32 and the connecting device 31 respectively. The switches 3213 and 3113 can be realized by mechanical buttons or touch buttons but the present disclosure is not limited thereto. The user can control the wireless transmission device 32 to enter the connectable mode via the switch 3213, or the user can control the connecting device 31 to directly enter the connectable mode via the switch 3113, but the present disclosure is not limited thereto.

The processors 323 and 314 are the main components responsible for signal processing in the wireless transmission device 32 and the connection device 31 respectively. In an embodiment of the present disclosure, the processor 323 of the wireless transmission device 32 receives the trigger signal generated by activating the switch 3213, for generating the enable signal accordingly. The processor 314 of the connecting device 31 then receives the enable signal, processes the received enable signal and performs subsequent actions (such as turning on the Zigbee module 312) accordingly. In another embodiment, the user can also operate the switch 3113 of the connecting device 31 for generating the trigger signal for the processor 314 to perform subsequent actions.

The processor 314 of the connecting device 31 is also coupled to the storage module 313. The storage module 313 is used for storing connection data of the wireless transmission device 32 which connects to the connecting device 31. The storage module 313 can be achieved by volatile memory (e.g. RAM) or non-volatile memory (e.g. ROM), but the present disclosure is not limited thereto.

The wireless transmitting unit 3211 can be a conventional infrared LED (light-emitting diode) or other components capable of emitting infrared rays, such as an infrared LED in specifications of 3M/M or 5 mm, etc. The wireless receiving unit 3111 can be a conventional infrared receiving unit module, such as the IRM-2638 remote infrared receiver module, the IRM0208-A538 remote infrared receiver module or the IRM-3638N3 remote infrared receiver module, etc. Although the above mentioned wireless transmitting unit 3211 and the wireless receiving unit 3111 utilize infrared components as an example, but the present disclosure is not limited thereto.

In an embodiment of the present disclosure, the wireless transmitting unit 3211 and the wireless receiving unit 3111 are to provide the user to wirelessly enable the connecting device 31 to enter the connectable mode from the wireless transmission device 32, when the wireless transmission device 32 and the connecting device 31 are initially connected. For instance, the user firstly activates the switch 3213 of the wireless transmission device 32 to provide a connection command (i.e. trigger signal). The processor 323 processes the connection command for generating an enable signal. The wireless transmitting unit 3211 then transmits the enable signal. The wireless receiving unit 3111 of the connecting device 31 receives the enable signal. The connecting device 31 which receives the enable signal then processes the enable signal via the processor 314 and enables the Zigbee module 312 to enter the connectable mode.

When the user utilizes the wireless transmission device 32 to remotely control the connecting device 31, the encoder 3213 and the decoder 3112 can verify the enable signal being transmitted or received is recognized or authorized by the user, so as to prevent misinterpretations of other unexpected wireless transmission devices, other malicious connecting devices or other wireless remote controllers, etc. In an embodiment of the present disclosure, the encoder 3212 and the decoder 3112 can be realized by pulse width modulation (PWM) applied by the NEC code of an infrared remote control command. The above mentioned embodiment is merely exemplary, the encoder 3212 and the decoder 3112 can also be realized by other modulation coding methods known by those skilled in the art, and the present disclosure is not limited thereto. For instance, the enable signal generated by the processor 323 can be encoded by the encoder 3212 before being transmitted by the wireless transmitting unit 3211. Subsequently the wireless receiving unit 3111 of the connecting device 31 receives the encoded enable signal and decodes the encoded enable signal with the decoder 3112 before sending it to the processor 314.

The Zigbee modules 322 and 312 are responsible for data signal transmission for the wireless transmission device 32 and the connecting device 31 respectively. The Zigbee modules 322 and 312 can be composed by Zigbee module chips. Zigbee is a low data rate, short-ranged wireless communication protocol. Zigbee builds upon the physical layer and the media access control layer defined in IEEE standard 802.15.4. The present disclosure merely utilizes the Zigbee module for exemplary purposes. Who's skilled in the art can utilize other methods such as Wi-Fi or Bluetooth and the present disclosure is not limited thereto.

Figure 3B:
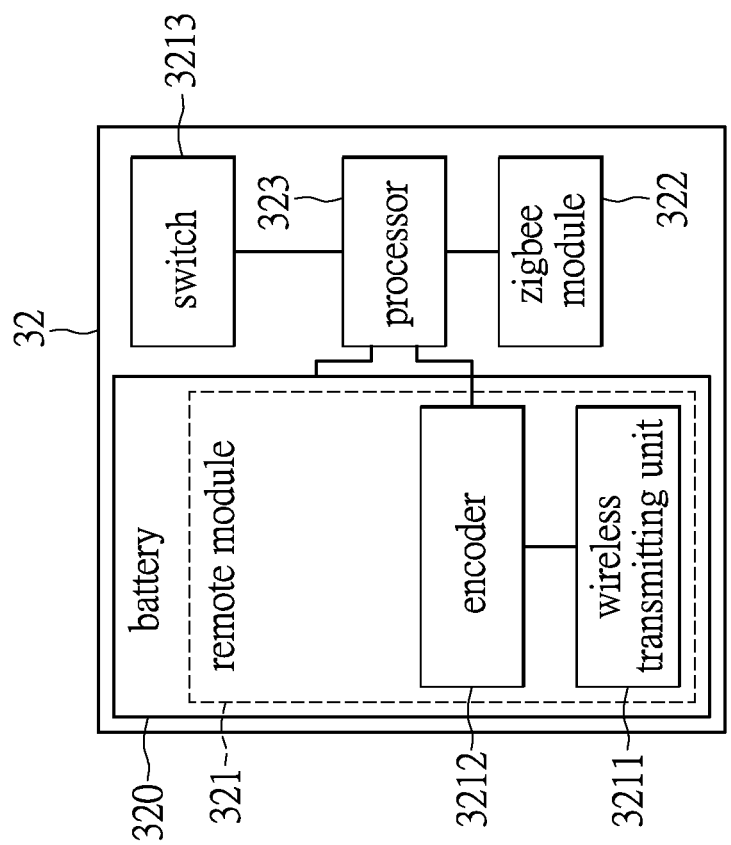
FIG. 3B is a structural diagram illustrating a wireless transmission device and a connecting device according to another embodiment of the present disclosure.

Please refer to FIG. 3B. FIG. 3B is a structural diagram illustrating a wireless transmission device and a connecting device according to another embodiment of the present disclosure. In another embodiment of the present disclosure, the wireless transmission device 32 comprises a battery 320, a switch 3213, a processor 323 and a Zigbee module 322. The battery 320 comprises a remote module 321. The remote module 321 comprises an encoder 3212 and a wireless transmitting unit 3211. The battery 320 comprises a transmission interface, coupled to the processor 323. The wireless transmission device 32 of the present embodiment differs to that of the embodiment shown in FIG. 3A in that the wireless transmission device 32 of the present embodiment comprises the battery 320 and the battery 320 comprises the remote module 321. The switch 3213 is disposed on an external part of the remote module 321. In other words, the switch 3213 is located on the wireless transmission device 32. For instance, switch 3213 can be disposed at a position on the casing of the wireless transmission device 32 for the user to operate. Other components are similar to those shown in FIG. 3A and the relative descriptions are omitted hereinafter.

The battery 320 can be a replaceable module. More specifically, the battery 320 can be replaced in a way similar to replace a conventional power-supplying battery. Hence, when a user has placed the battery 320 into the wireless transmission device 32, the user can directly control the remote module 321 of the battery 320 via the switch 3213 and the processor 323.

When using a conventional power-supplying battery, a user can utilize the switch 3213 only to operate the wireless transmission device 32 to transmit the beacon request to search for a connecting device 21 that is currently in the connectable mode. When the battery 320 of the present embodiment is utilized, the processor 323 determines whether the connected battery comprises the remote module 321, for accordingly switching to a remote mode.

Similarly, when the wireless transmission device 32 is in the remote mode, the user has activated the switch 3213, and the trigger signal is generated for the processor 323 to generate an enable signal. When the processor 323 has generated the enable signal, the processor 323 further convert the enable signal to a clock signal (e.g. a clock signal of different voltage potentials generated by consecutively turning power on and off in intervals of 0.1 ms for 10 seconds, etc.) that controls the battery 320 to power on or power off. The processor 323 controls the transmission interface coupled to the battery 320 to provide the clock signal to the wireless transmitting unit 3211. In other words, the processor 323 transmits the enable signal, which has been converted into the clock signal, to the wireless transmitting unit 3211 for transmission, via the transmission interface of the battery 320. However, as mentioned in the previous embodiment, the enable signal, which has been converted to the clock signal, can also be encoded by the encoder 3212 first before being transmitted to the wireless transmitting unit 3211 for transmission.

This way, functions of the remote module 321 can be added to the conventional wireless transmission device without requiring the manufacturers to alter much of the overall circuit structure, so the wireless transmission device 32 can be upgraded with minimum cost. Although the remote module 321 is exemplified as being comprised in the battery 320 in the present embodiment, the battery 320 can also be comprised in the remote module 321 in another embodiment of the present disclosure. The present disclosure is not limited thereto.

Figure 4:
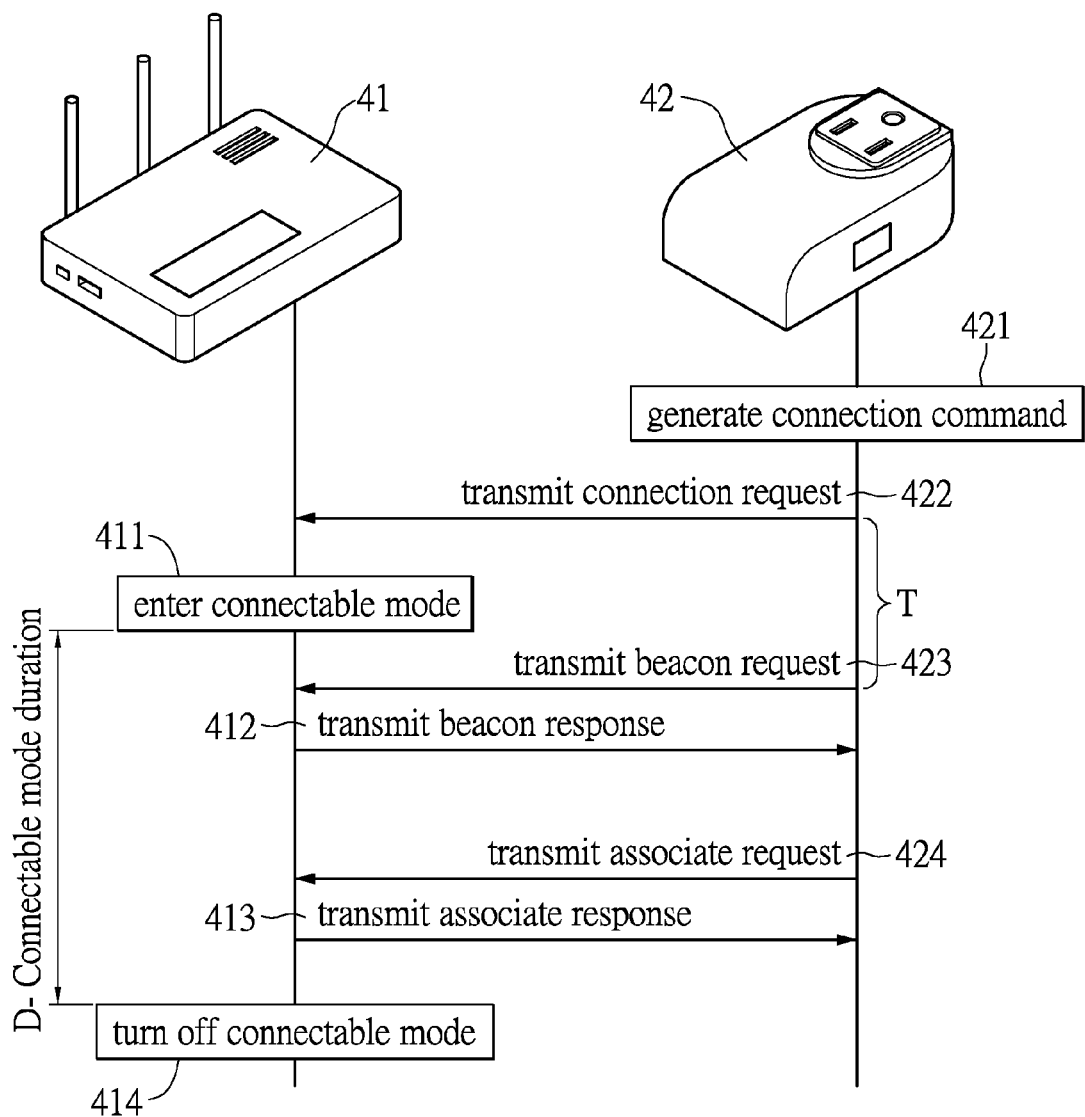
FIG. 4 is a flowchart illustrating a connection being established between a wireless transmission device and a connecting device according to an embodiment of the present embodiment.

Please refer to FIG. 3A and FIG. 4 together. FIG. 4 is a flowchart illustrating a connection being established between a wireless transmission device and a connecting device according to an embodiment of the present embodiment. When a user uses the wireless transmission device 42 for a first time, an initial connection has to be performed to the connecting device 41. Firstly, in step 421, the user activates the switch 3213 on the wireless transmission device 42 and generates a connection command. In step 422, the wireless transmission device 42 transmits a connection request 422 (equivalent to the enable signal mentioned above) to the connecting device 41. The connection request 422 transmitted by the wireless transmission device 42 is transmitted via the wireless transmitting unit 3211 and received by the wireless receiving unit 3111 of the connecting device 41.

In step 411, the connecting device 41 enters the connectable mode after receiving the connection request 422. More specifically, when the connecting device 41 has received the connection request 422, the processor 314 processes the connection request 422 and correspondingly turns on the Zigbee module 312 to enter the connectable mode. When the connecting device 41 has entered the connectable mode, the connecting device 41 starts counting down a waiting period of a connectable mode duration D, for allowing the connecting device 41 in the connectable mode to be searched by the wireless transmission device 42 that is within a broadcast range, in the connectable mode duration D. When the countdown of the connectable mode duration D has reached zero, the connecting device 41 turns off the Zigbee module 312 in step 414, for turning off the connectable mode.

After the user has transmitted the connection request via the wireless transmission device 42, the wireless transmission device 42 starts counting down a waiting period of a duration T, for the wireless transmission device 42 to wait for the connecting device 41 to enter the connectable mode. When the countdown of the duration T has reached zero, the wireless transmission device 42 transmits a beacon request on its own. The beacon request transmitted by the wireless transmission device 42 is transmitted via the Zigbee module 322 of the wireless transmission device 42. By sending out the beacon request, the wireless transmission device 42 searches for the nearby connecting device 41 (including the connecting device 41 the user intended to connect) that is in the connectable mode.

When the Zigbee module 312, which is in the connectable mode, of the connecting module 41 has received the beacon request transmitted from the wireless transmission device 42 within the connectable mode duration D, the connecting device 41 transmits a beacon response in step 412 to notify the wireless transmission device 42 that the connecting device 41 is in the connectable mode. When the wireless transmission device 42 has received the beacon response, the wireless transmission device 42 transmits an associate request in step 424, to the connecting device 41 to request joining the connecting device 41. In step 413, the connecting device 41 receives the associate request from the wireless transmission device 42 and transmits an associate response to the wireless transmission device 42, for completing the initial connection setup between the connecting device 41 and the wireless transmission device 42.

Figure 5:
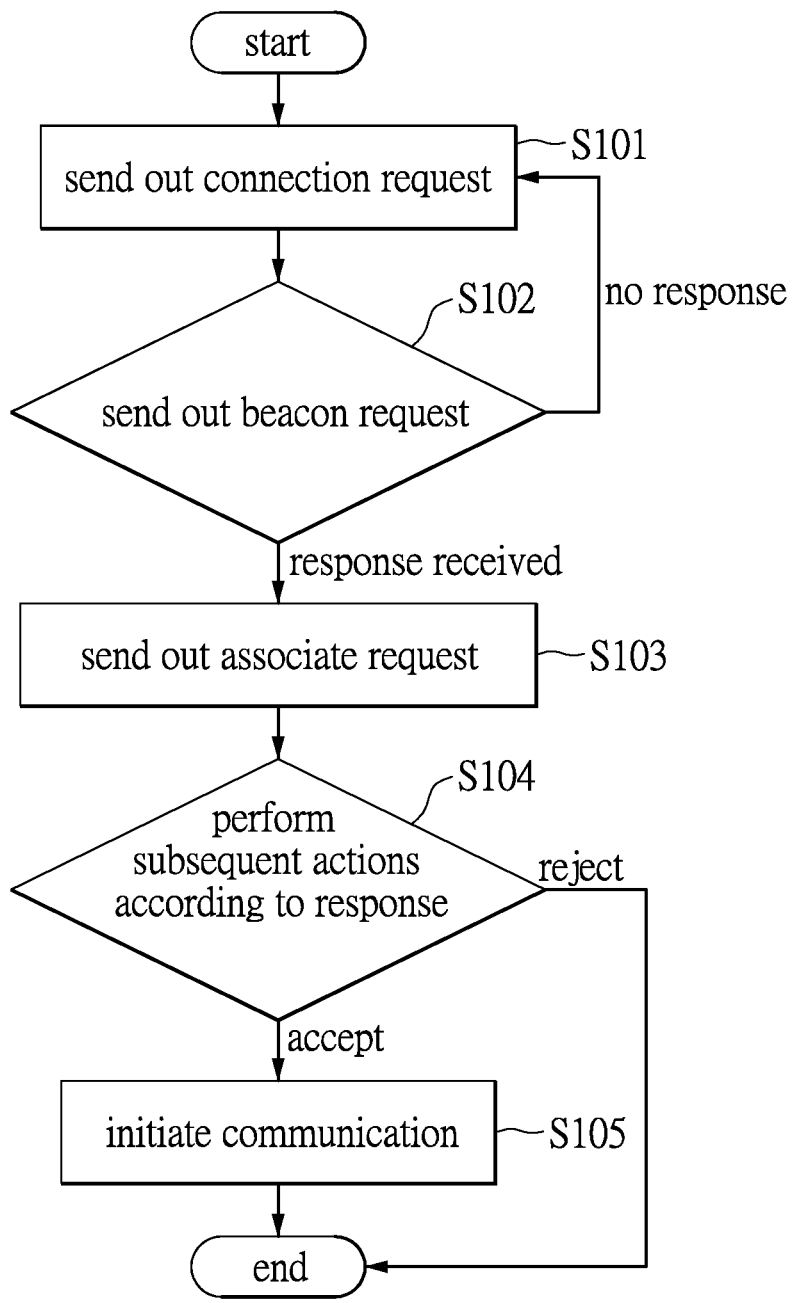
FIG. 5 is a flowchart illustrating a control method for the wireless transmission device to establish a connection according to an embodiment of the present disclosure.

Please refer to FIG. 4 and FIG. 5 together. FIG. 5 is a flowchart illustrating a control method for the wireless transmission device to establish a connection according to an embodiment of the present disclosure. The steps of the control method for the wireless transmission device 42 to establish a connection are further detailed in FIG. 5. Firstly, in step S101 the wireless transmission device 42 sends out a connection request according to a user command.

In step S102, the wireless transmission device 42 sends out a beacon request. After the wireless transmission device 42 has sent out the connection request, the wireless transmission device 42 counts down a waiting period of a duration T before sending out the beacon request. If the beacon request sent out by the wireless transmission device 42 is not responded, return to step S101 and the user determines whether the connection request is to be sent out again. In other words, at this stage the wireless transmission device 42 has not found the connecting device 41 that is in the connectable mode to connect. If beacon request sent out by the wireless transmission device 42 gets a response, meaning the connecting device 41 that is in the connectable mode and is able to join, is found, proceed to step S103.

In step S103, the wireless transmission device 42 sends out an associate request for the connecting device 41 that is in the connectable mode to join. In step S104, the wireless transmission device 42 performs subsequent actions according to a response of the connecting device 41 that is in the connectable mode and is intending to join. If the connecting device 41 that is in the connectable mode and is intending to join does not accept the associate request (e.g. the wireless transmission device 42 does not receive an associate response within a certain duration, or the wireless transmission device 42 receives a reject response, etc.), the connection process terminates. If the connecting device 41 that is in the connectable mode and is intending to join accepts the associate request (e.g. the wireless transmission device 42 receives the associate response within certain duration), the wireless transmission device 42 has successfully joined the connecting device 41 that is in the connectable mode.

In step S105, after the wireless transmission device 42 has completed the connecting operation, the wireless transmission device 42 can then initiate a communication mode for exchanging data with the connecting device 41 that is in the connectable mode, and the connection process is then ended.

Figure 6:
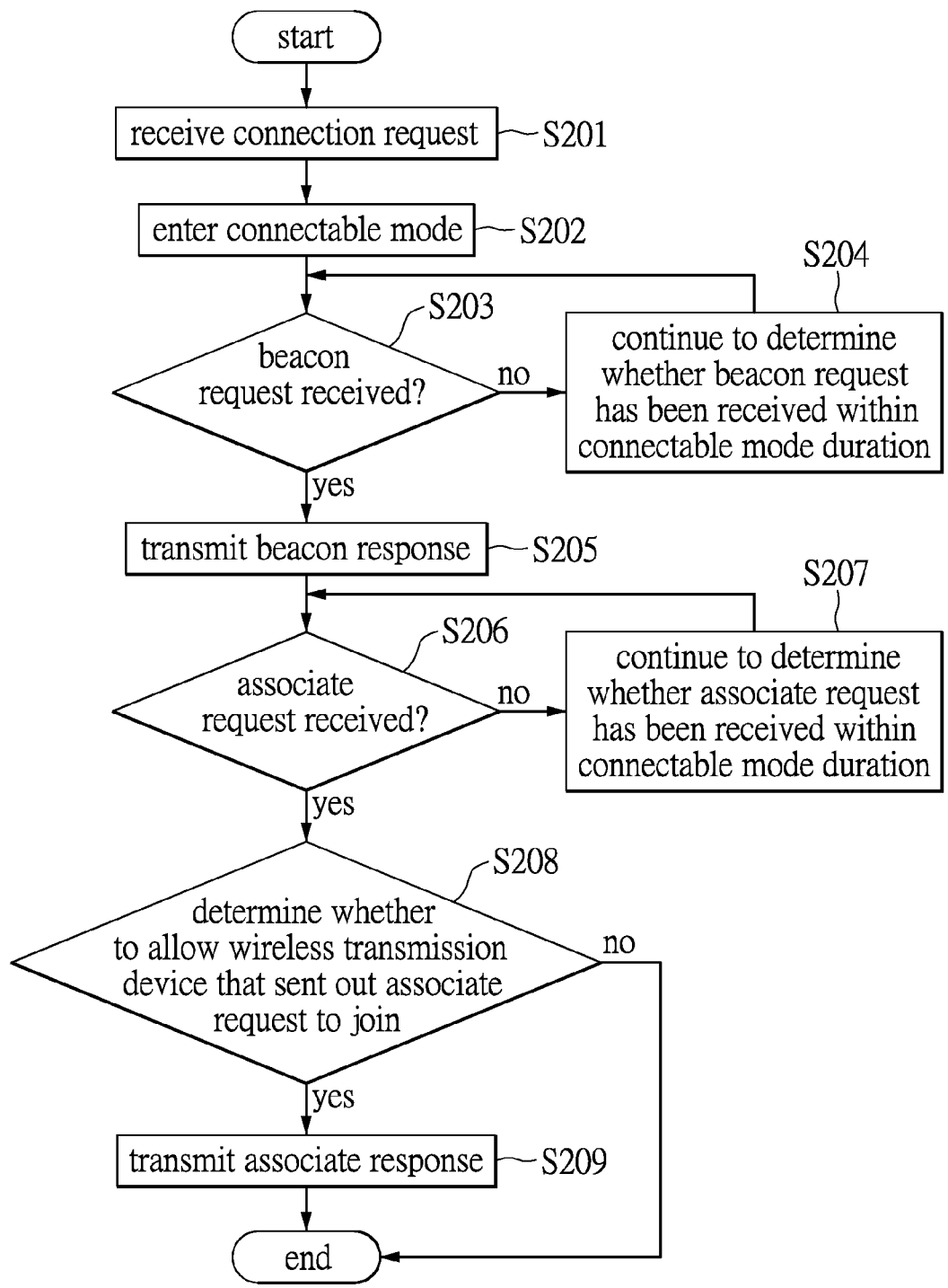
FIG. 6 is a flowchart illustrating a control method for a connecting device to establish a connection according to an embodiment of the present disclosure.

Please refer to FIG. 4 and FIG. 6. FIG. 6 is a flowchart illustrating a control method for a connecting device to establish a connection according to an embodiment of the present disclosure. The steps of the control method for the connecting device 41 to establish a connection are further detailed in FIG. 6. Firstly, in step S201, the connecting device 41 receives a connection request. The connecting device 41 is always on standby for receiving a signal of the connection request. In step S202, the connecting device 41 enters the connectable mode. More specifically, when the connecting device 41 receives the connection request, the connecting device 41 starts entering the connectable mode. The connecting device 41 initiates an internal transmission module (e.g. the Zigbee module mentioned in the above embodiment) for entering the connectable mode. The connecting device 41 then starts counting down a waiting period of a connectable mode duration D.

In step S203, when the connecting device 41 has entered the connectable mode, the connecting device 41 determines whether the beacon request is received. If the connecting device 41 has received the beacon request, proceed to the next step S205. If the beacon request is not received, the connecting device 41 continues to determine whether the beacon request has been received within the waiting period of the connectable mode duration D in step S204. The connecting device 41 turns off the connectable mode when the countdown of connectable mode duration D has reached zero.

In step S205, the connecting device 41 transmits the beacon response to respond the beacon request received, as well as notifying other wireless transmission devices the presence of the connecting device 41 that is in the connectable mode. In step S206, the connecting device 41 then determines whether an associate request has been received. If the connecting device 41 has received the associate request, proceed to the next step S208. If the associate request is not received, the connecting device 41 continues to determine whether an associate request has been received within the waiting period of the connectable mode duration D in step S207. The connecting device 41 turns off the connectable mode when the countdown of connectable mode duration D has reached zero.

In step S208, when the associate request has been received, the connecting device 41 determines whether to allow the wireless transmission device 42 that sent out the associate request to join the wireless network. If the connecting device 41 permits the wireless transmission device 42 that sent out the associate request to join the wireless network, the next step S209 is proceed. If the connecting device 41 does not permit the wireless transmission device 42 that sent out the associate request to join the wireless network, the connecting device 41 terminates the connection process or sends out a reject response (not illustrated in FIG. 6).

In step S209, the connecting device 41 transmits an associate response, for the connecting device 41 and the wireless transmission device 42 to establish a connection and the connection process is then terminated. Subsequently, when the wireless transmission device 42 has joined the wireless network corresponding to the connecting device 41, the wireless transmission device 42 can then exchange data with the connecting device 41 and other wireless communication devices within the wireless network.

In summary, by utilizing the wireless transmission device and the connecting device according to the embodiments of the present disclosure, the operation during establishing a network connection for the conventional wireless transmission device and the conventional connecting device, such as the Zigbee wireless transmission device and the connecting device, can be improved. Hence the user can control the wireless network system, such as the Zigbee wireless network system, according to the conventional behaviors (e.g. similar to controlling a TV and an air conditioner remotely, etc.). The above mentioned wireless transmission device and the connecting device can provide an operational manner that is more friendly and intuitive to the user, as well as increasing the market competitiveness of the connecting device (e.g. the Zigbee connecting device).

The above-mentioned descriptions represent merely the exemplary embodiment of the present disclosure, without any intention to limit the scope of the present disclosure thereto. Various equivalent changes, alternations or modifications based on the claims of present disclosure are all consequently viewed as being embraced by the scope of the present disclosure.

What is claimed is:

1. A wireless transmission device, for wirelessly connecting to a connecting device, comprising:
    a remote module, comprising:
        a wireless transmitting unit, for transmitting a first enable signal which can be processed so as to assist or enable the connecting device to enter a connectable mode that allows the wireless transmission device to discover the connecting device; and
        a processor, coupled to the remote module, for controlling the wireless transmitting unit to transmit the first enable signal to the connecting device;
    a transmission module, being a Zigbee module, coupled to the processor, for transmitting at least one data signal when a connection between the wireless transmission device and the connecting device has been established; and
    a switch, coupled to the processor, and operated by an user for generating a trigger signal for the wireless transmitting unit to transmit the first enable signal;
    wherein when the connecting device receives the first enable signal, the connecting device operates in the connectable mode for a connectable mode duration, and after the connectable mode duration elapses, the connecting device turns off the connectable mode;
    in the connectable mode duration:
    when the wireless transmitting unit has transmitted the first enable signal, the transmission module transmits a beacon signal to the connecting device after a duration;
    when receiving the beacon signal, the connecting device transmits a beacon response to the transmission module;
    when receiving the beacon response, the transmission module transmits an associate request to the connecting device;
    when receiving the associate request, the connecting device transmits the associate response to the transmission module; and
    when the transmission module receives the associate response, the connection is then established, and a communication mode is initiated for exchanging data between the wireless transmission device and the connecting device.

2. The wireless transmission device according to claim 1, wherein the remote module further comprises:
    an encoder, coupled to the processor, when the processor receives the trigger signal, the first enable signal is encoded by the encoder before being transmitted to the wireless transmitting unit.

3. A connecting device, wherein at least one wireless transmission device is used to wirelessly connect to the connecting device, and the connecting device comprising:
    an enable module, comprising:
    a wireless receiving unit, for receiving at least a first enable signal which can be processed so as to assist or enable the connecting device to enter a connectable mode that allows the at least one wireless transmission device to discover the connecting device, wherein a first switch of the at least one wireless transmission device is operated by an user for triggering the at least one wireless transmission device to transmit the first enable signal; and
    a processor, coupled to the enable module, for controlling the wireless receiving unit to receive the first enable signal transmitted by the wireless transmission device; and
    a transmission module, being a Zigbee module, coupled to the processor, for transmitting at least one data signal when a connection between the connecting device and the at least one wireless transmission device has been established;
    wherein when the connecting device receives the first enable signal, the connecting device operates in the connectable mode for a connectable mode duration, and after the connectable mode duration elapses, the connecting device turns off the connectable mode;
in the connectable mode duration:
when the at least one wireless transmission device has transmitted the first enable signal, the at least one wireless transmission device transmits a beacon signal to the connecting device after a duration;
when receiving the beacon signal, the connecting device transmits a beacon response to the at least one wireless transmission device;
when receiving the beacon response, the at least one wireless transmission device transmits an associate request to the connecting device;
when receiving the associate request, the connecting device transmits the associate response to the at least one wireless transmission device; and
when the at least one wireless transmission device receives the associate response, the connection is then established, and a communication mode is initiated for exchanging data between the at least one wireless transmission device and the connecting device.

4. The connecting device according to claim 3, further comprising:
a storage module, coupled to the processor, and configured for storing device data of the at least one wireless transmission device which transmits the data signal to the connecting device.

5. The connecting device according to claim 3, wherein the enable module further comprises:
a second switch, coupled to the processor, and configured for generating a second enable signal, wherein the connecting device enters the connectable mode based on the second enable signal.

6. The connecting device according to claim 3, wherein the enable module further comprises:
a decoder, coupled to the wireless receiving unit, when the wireless receiving unit has received the enable signal, the enable signal is decoded by the decoder and transmitted to the processor.

7. A wireless transmission device, for wirelessly connecting to a connecting device, comprising:
a battery, for providing power to the wireless transmission device and receiving a clock signal, the battery comprising:
a remote module, comprising:
a wireless transmitting unit, for transmitting a first enable signal which can be processed so as to assist or enable the connecting device to enter a connectable mode that allows the wireless transmission device to discover the connecting device;
a processor, coupled to the battery, for generating the clock signal and controlling the wireless transmitting unit to transmit the first enable signal to the connecting device;
a transmission module, being a Zigbee module, coupled to the processor, for transmitting at least one data signal when a connection between the connecting device and the wireless transmission device has been established; and
a switch, coupled to the processor, and operated by an user for generating a trigger signal for the wireless transmitting unit to transmit the first enable signal;
wherein when the connecting device receives the first enable signal, the connecting device operates in the connectable mode for a connectable mode duration, and after the connectable mode duration elapses, the connecting device turns off the connectable mode;
in the connectable mode duration:
when the wireless transmitting unit has transmitted the first enable signal, the transmission module transmits a beacon signal to the connecting device after a duration;
when receiving the beacon signal, the connecting device transmits a beacon response to the transmission module;
when receiving the beacon response, the transmission module transmits an associate request to the connecting device;
when receiving the associate request, the connecting device transmits the associate response to the transmission module; and
when the transmission module receives the associate response, the connection is then established, and a communication mode is initiated for exchanging data between the wireless transmission device and the connecting device.

* * * * *